United States Patent [19]

Snow et al.

[11] 4,312,425
[45] Jan. 26, 1982

[54] CYCLIC LUBRICANT DISTRIBUTOR VALVE

[75] Inventors: John P. Snow, Sagamore Hills; James J. Callahan, Mentor, both of Ohio

[73] Assignee: Houdaille Industries, Inc., Fort Lauderdale, Fla.

[21] Appl. No.: 941,557

[22] Filed: Sep. 11, 1978

[51] Int. Cl.³ .............................................. F16N 25/02
[52] U.S. Cl. ..................................... 184/7 D; 184/7 E
[58] Field of Search .............. 184/7 D, 7 E, 7 F, 7 R; 137/596, 624.14

[56] References Cited

U.S. PATENT DOCUMENTS

| | | | |
|---|---|---|---|
| 3,219,146 | 11/1965 | Leese et al. | 184/7 E |
| 3,298,460 | 1/1967 | Porter et al. | 184/7 D |
| 3,653,466 | 4/1972 | Fujita et al. | 184/7 D |
| 3,921,760 | 11/1975 | Brownrigg | 184/7 E |
| 4,105,094 | 8/1978 | Callahan | 184/7 E X |

FOREIGN PATENT DOCUMENTS 162954 11/1975 Italy .

Primary Examiner—David H. Brown
Attorney, Agent, or Firm—Hill, Van Santen, Steadman, Chiara & Simpson

[57] ABSTRACT

A cyclic lubricant distributor valve has an inlet block unit, an end block unit and at least three intermediate block units. Each of the intermediate block units has a bore, a spool movable in the bore and at least one lubricant outlet. A series of ports and passages are formed in the various block units to provide for cyclic operation of the distributor valve. Each of the intermediate block units is formed of a base member, in which the outlet (or outlets) is formed, and a separate and separable spool member, in which a bore is formed containing a movable spool. Through bolts connect the inlet block unit, the end block unit and the base members of the intermediate block units in fixed assembly. Other bolts connect each of the spool members in fixed assembly only with its corresponding base member.

2 Claims, 14 Drawing Figures

U.S. Patent  Jan. 26, 1982  Sheet 1 of 6  4,312,425
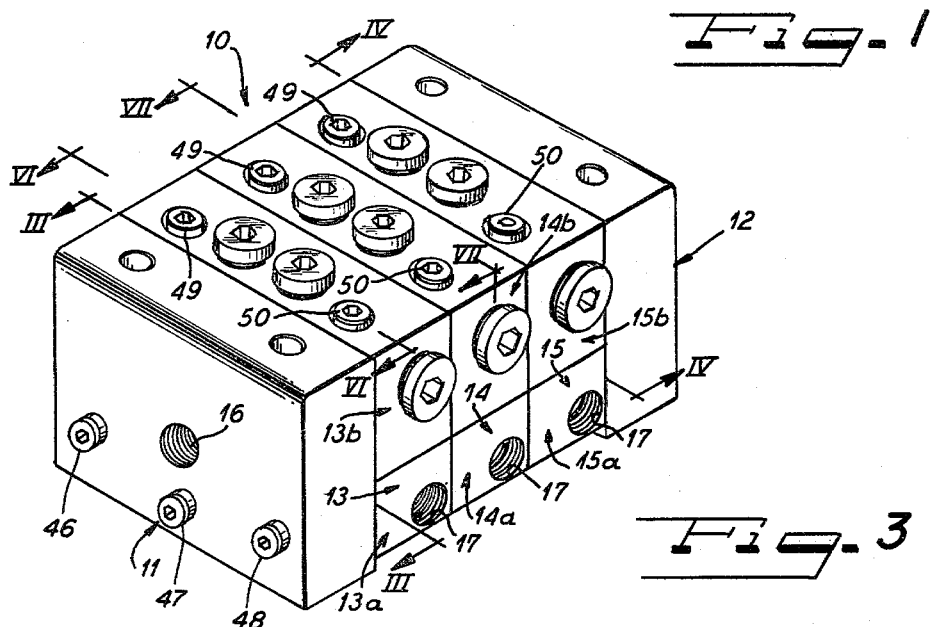
Fig. 1
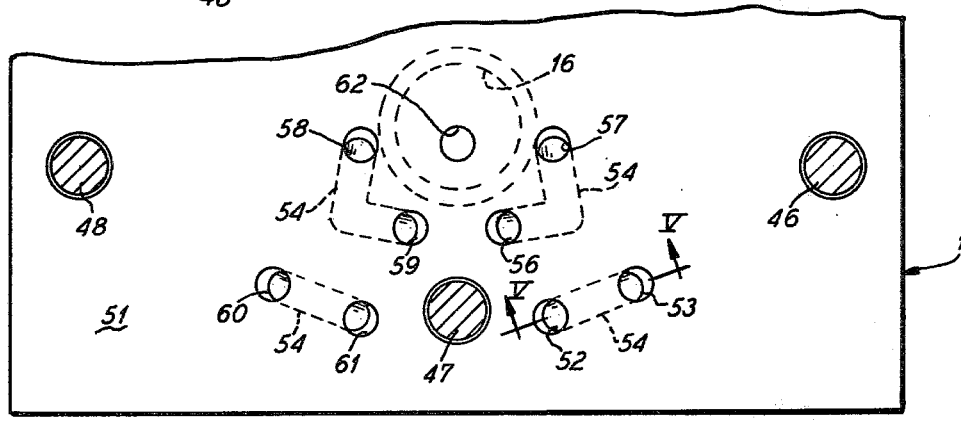
Fig. 3
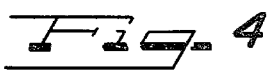
Fig. 4
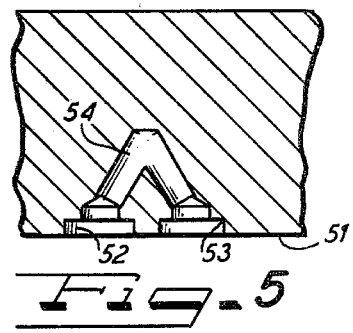
Fig. 5
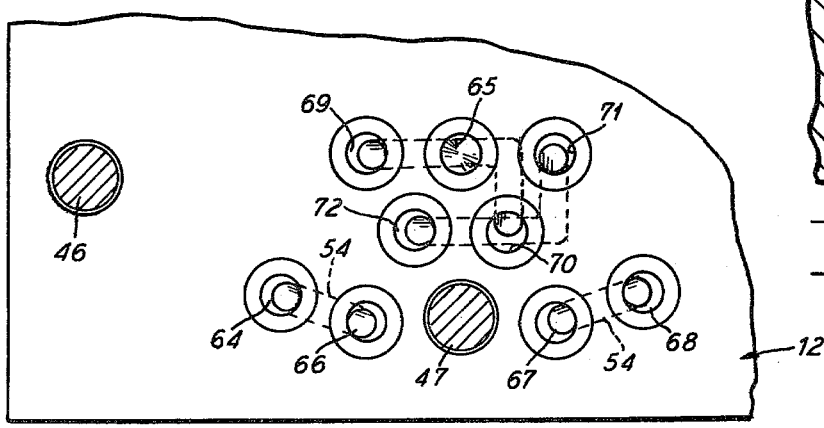

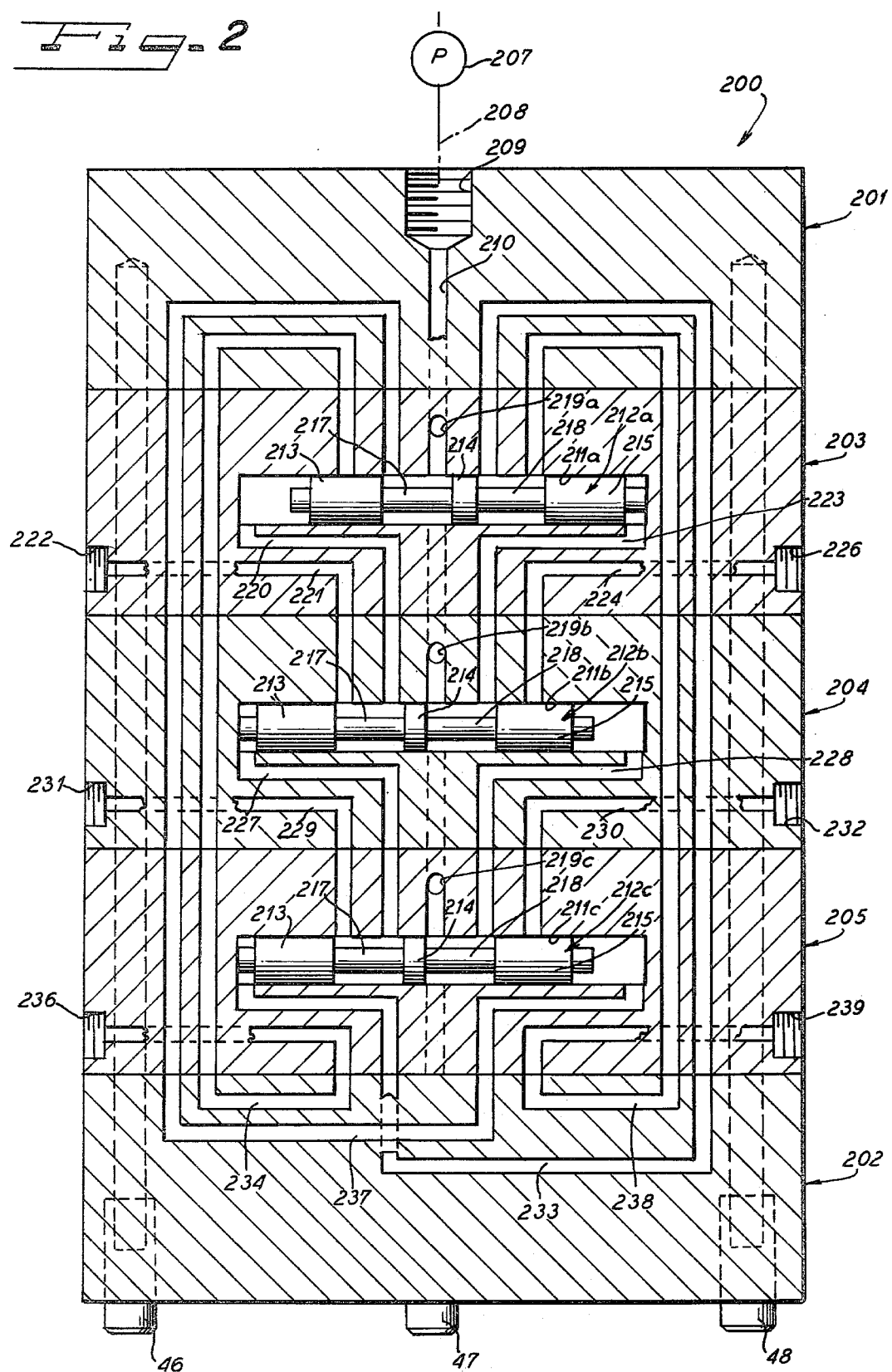

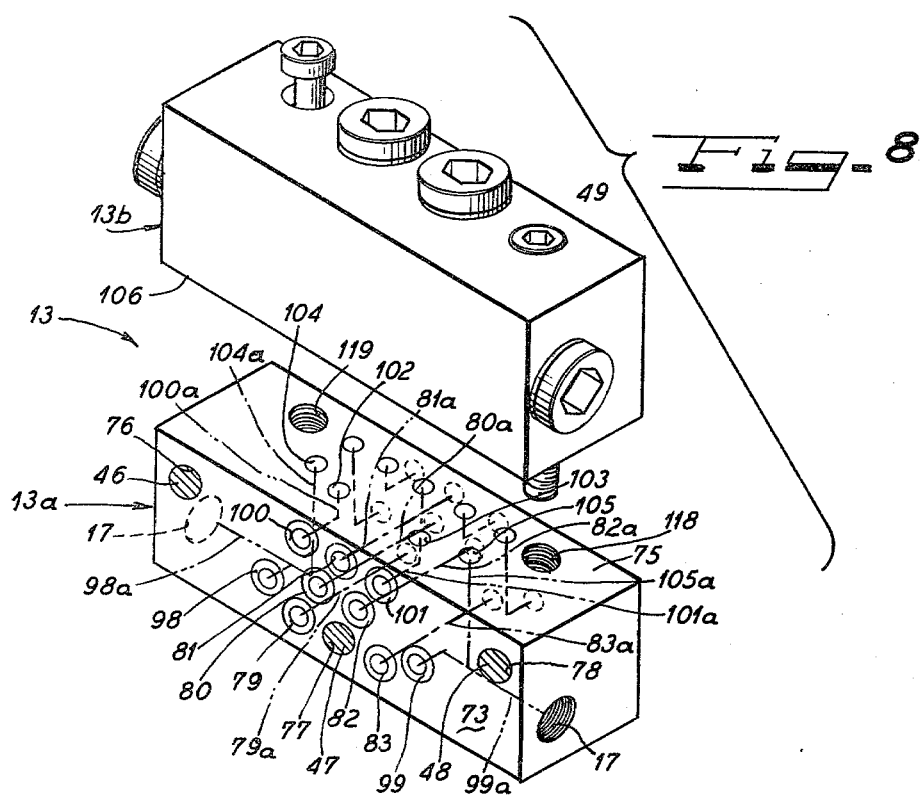
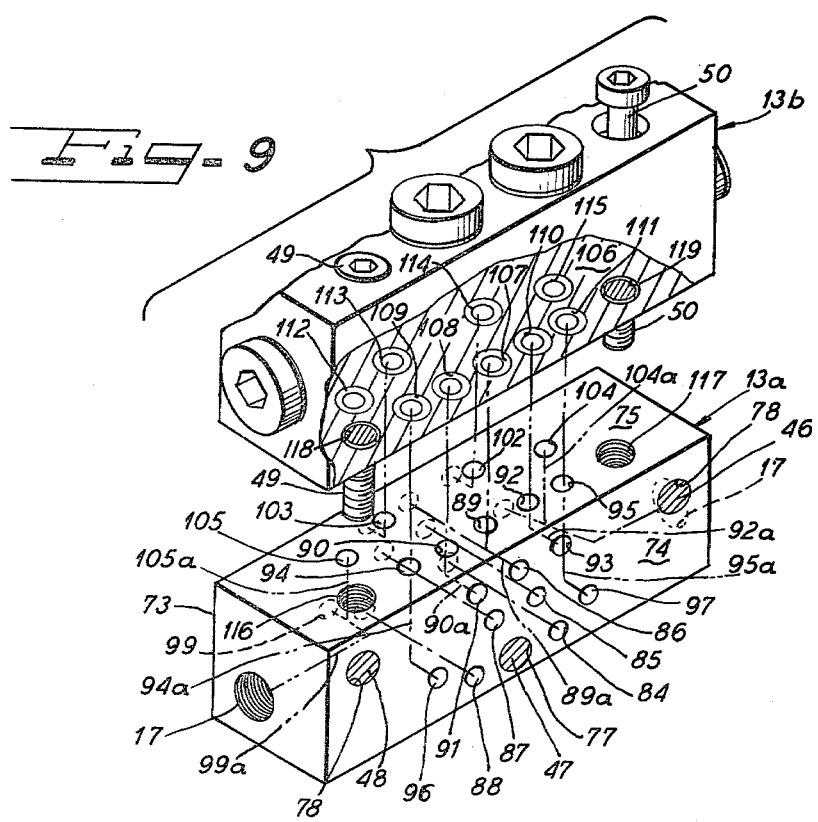

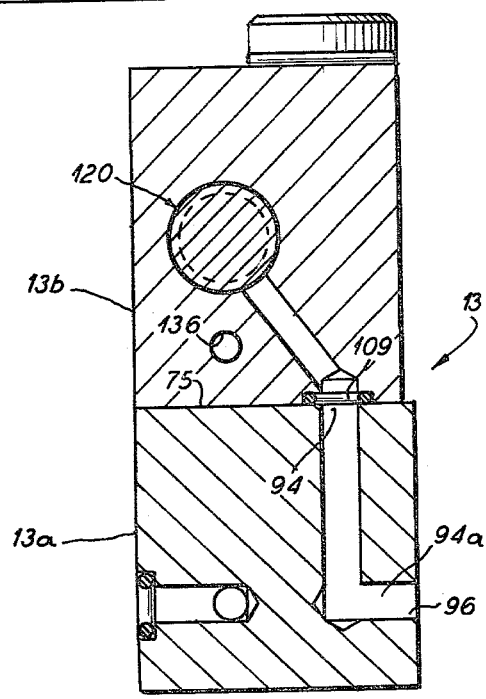
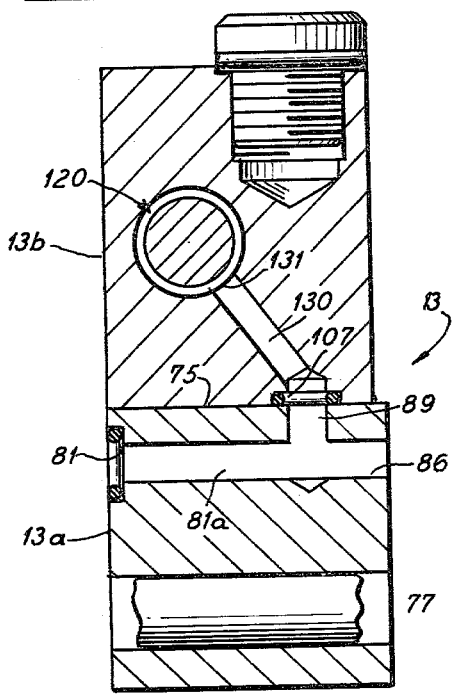
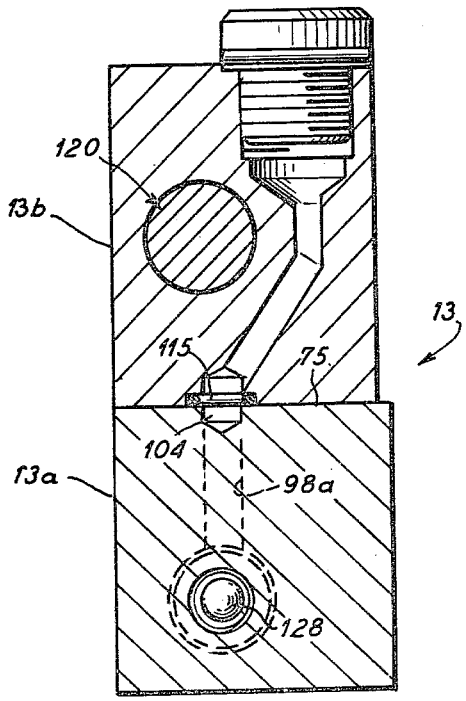
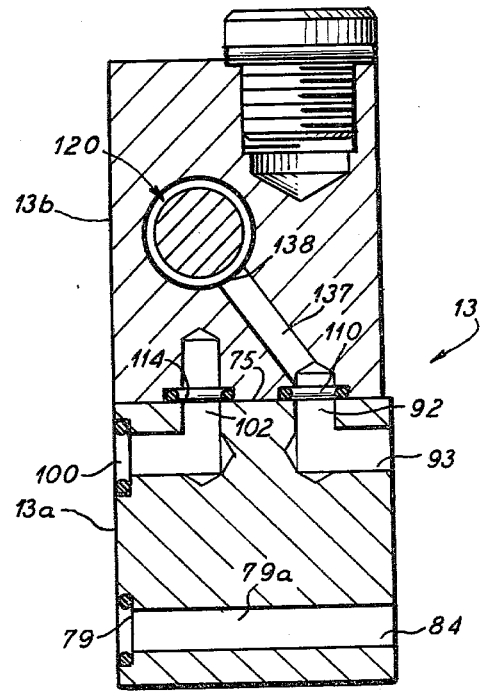

CYCLIC LUBRICANT DISTRIBUTOR VALVE

BACKGROUND OF THE INVENTION

1. Field of the Invention

This invention relates generally to the field of lubricant distributor valves and more particularly to lubricant distributor valves which are constructed, adapted and arranged to operate cyclically, that is, to meter and discharge a predetermined quantity of lubricant to each of a number of points of use, such as bearings, in sequence.

2. Description Of The Prior Art

Lubricant distributor valves of the general type to which reference is made in the introductory paragraph have been known for many years. For reasons mainly involving manufacturing and maintenance ease, such valves have ordinarily been constructed of a plurality of separate parts fastened together by bolts to form a unitary valve structure. The use of bolts or similar fastening devices enables the various parts to be separated and removed from one another for ease in cleaning, repairing and, if necessary, replacing the parts.

Leese et al U.S. Pat. No. 3,219,146, for example, discloses a cyclical lubricant distributor valve in which a series of intermediate block units are disposed between an inlet block unit and an end block unit, and a series of through bolts are used to separably fasten the various block units together in fixed assembly.

As is typical of cyclic lubricant distributor valves to which the present invention pertains, the valve disclosed in the Leese et al patent includes at least three intermediate block units, each of which contains a bore and a spool movable back and forth within the bore. The spools of the various intermediate block units move sequentially and as each spool moves it performs two functions.

First, the spool serves to force a predetermined quantity of lubricant through an outlet to a bearing or other point of use. Second, the spool serves as a valve, the operation of which is necessary to the cyclic operation of the entire distributor valve.

In the Leese et al system each of the intermediate block units has a pair of side walls in which a plurality of ports are formed. All of the lubricant which flows from the inlet of the valve to the various outlets flows through the ports formed in the side walls of the intermediate blocks.

Porter et al U.S. Pat. No. 3,298,460 also discloses a cyclic lubricant distributor valve but in that arrangement the valve comprises a single integral base member on which are mounted a plurality of individual block units. The lubricant inlet and the various outlets are formed in the base member. The movable spools are all contained within the individual block units. Each block unit contains a bottom wall in which are formed a number of ports which communicate with corresponding ports formed in the base member. All of the lubricant which flows from the inlet to the various outlets flows through the bottom walls of the individual block units. No fluid communication exists between the side walls of adjacent block units.

It has been suggested that the arrangement disclosed in Porter et al U.S. Pat. No. 3,298,460 enjoys certain advantages over the arrangement disclosed in Leese et al U.S. Pat. No. 3,219,146. See, for example, the article "Divider Valves—A New Design Approach" by Edward B. Porter, Sr. in Iron and Steel Engineer, June, 1967, pages 135 through 142.

While both the Leese et al and Porter et al systems have been advantageously utilized in a variety of applications, neither arrangement, nor any others of which we are aware, would appear to be optimum for all applications.

For example, the Leese et al system can be enlarged in terms of the number of outlets merely by adding additional intermediate block units. In doing so, however, the through bolts must be completely removed. This often requires replacement of all gasketing material, such as O-rings and the like, particularly when the distributor valve is being used in a high pressure application, in which the through bolts must necessarily be highly torqued to avoid leakage between the faying faces of the various block units.

In the Porter et al system the number of block units which are active can be increased (or decreased) without disconnecting the inlet and outlet lines from the base member and without the necessity of removing through bolts which extend through the entire distributor valve. On the other hand, additional outlets cannot be added after the total number for which the base member has been constructed are met. There are, however, a number of applications in which the ultimate number of lubrication points to be serviced by a single distributor valve cannot be predetermined. It is to those applications that the principles of the present invention are particularly concerned.

SUMMARY OF THE INVENTION

An object of the present invention is to provide a lubricant distributor valve of the cyclic type, the capacity of which can be easily modified both by adding outlets and by modifying the capacity of the individual block units.

Another object of the invention is to provide a cyclic lubricant distributor valve which comprises a plurality of intermediate block units sandwiched between an inlet block unit and an end block unit, but in which the capacity of the individual intermediate block units can be changed without removing the through bolts which maintain the entire base portion of the distributor valve in fixed assembly.

Another object of the invention is to provide a cyclic lubricant distributor having the add-on capability of the distributor valve shown in the Leese et al patent, while having the serviceability and replacement characteristics of the arrangement disclosed in the Porter et al patent.

The present invention may be summarized as a cyclic lubricant distributor having an inlet block unit, an end block unit and a plurality of intermediate block units located between the inlet and end block units. The intermediate block units, instead of being constructed of a unitary housing member, are formed essentially of two parts, a base member and a spool member. The lubricant outlets which connect to the various points of use are located in the base member, whereas the bore within which the movable spool is carried is formed in the spool member. The base members of the various intermediate block units, along with the inlet block unit and the end block unit, are connected in fixed assembly by fastening members such as through bolts, and each spool member is connected in fixed assembly by other fastening means only to its associated base member.

By virtue of the present invention, all of the lubricant which passes between intermediate block units does so only through the base members thereof, whereas all of the lubricant which passes into and out of the bores of the various spool members passes through the mating or faying faces formed between the spool members and their corresponding base members.

Many other features, advantages and additional objects will become manifest to those versed in the art from the detailed description of the invention which follows and the accompanying sheets of drawings in which a preferred embodiment of a cyclic lubricant distributor valve incorporating the principles of the present invention is shown by way of illustrative example.

BRIEF DESCRIPTION OF THE DRAWING

FIG. 1 is a perspective view of a cyclic lubricant distributor valve constructed in accordance with the principles of the present invention.

FIG. 2 is a schematic diagram illustrating the hydraulic circuitry and mode of operation of a cyclic distributor valve of the type involved in the present invention.

FIG. 3 is an enlarged view of a portion of the inner side wall of the inlet block unit of the present invention taken along lines III—III of FIG. 1.

FIG. 4 is an enlarged fragmentary view of the inner side wall of the end block unit of the present invention, taken along lines IV—IV of FIG. 1.

FIG. 5 is a sectional view taken along lines V—V of FIG. 4.

FIG. 8 is a perspective view of an intermediate block unit in which the spool member and the base member have been separated from one another for ease in understanding the relationship between the various ports thereof.

FIG. 9 is similar to FIG. 8, but shows the base member and the spool member from a side opposite that in which they are shown in FIG. 8.

FIGS. 10 through 13 disclose various sections through an intermediate block unit, and are taken respectively along lines X—X, XI—XI, XII—XII and XIII—XIII of FIG. 7.

DESCRIPTION OF THE PREFERRED EMBODIMENT

Figure 6:
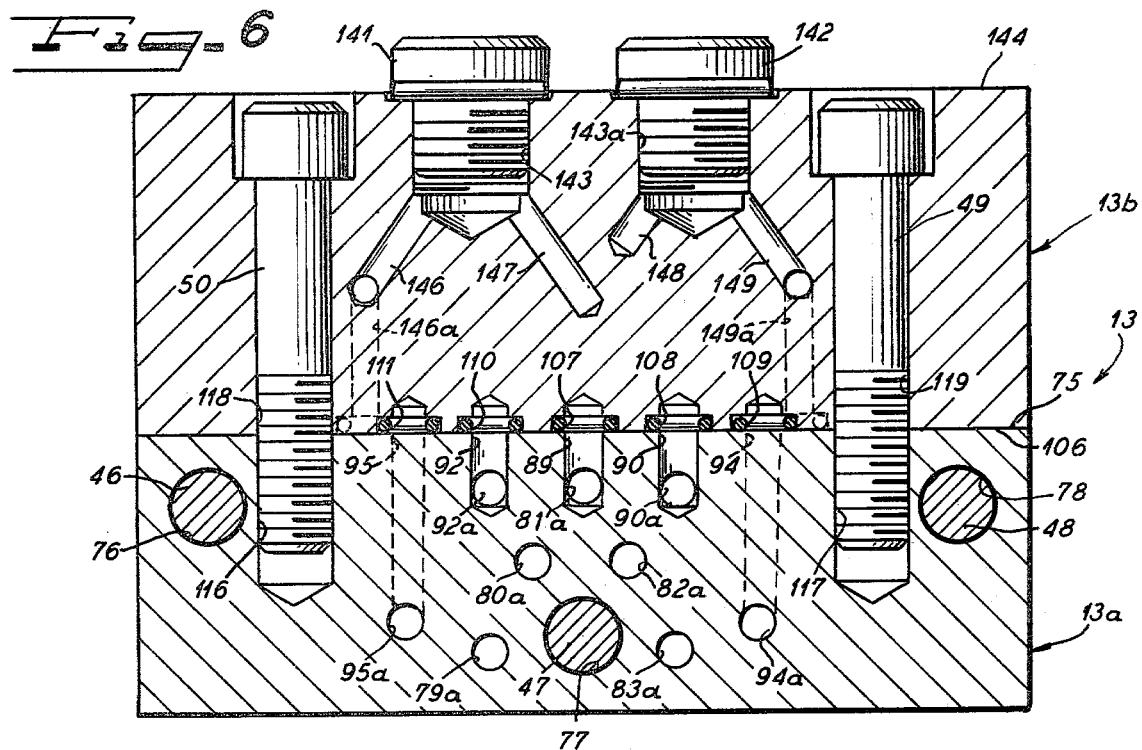
FIG. 6 is a sectional view of an intermediate block unit, taken along lines VI—VI of FIG. 1.

FIG. 1 illustrates a cyclic lubricant distributor valve, constructed in accordance with the principles of the present invention, indicated generally at reference numeral 10. The distributor valve 10 comprises an inlet block unit 11, an end block unit 12 and a plurality of intermediate block units shown respectively at reference numerals 13, 14 and 15. While more than three intermediate block units can be used in a valve (and indeed the capability of adding more is a principal advantage of the present invention) at least three intermediate block units are required in a cyclic valve of the type illustrated, as will be appreciated by those skilled in the art.

The intermediate block units 13, 14 and 15 are identical, and each comprises a base member and a separate spool member to which it is connected. The base members are indicated by reference numerals corresponding to the reference numerals applied to their respective intermediate block units, followed by the suffix "a". The spool members are similarly identified, followed by the suffix "b".

Thus the base and spool members of the intermediate block unit 13 are indicated respectively at reference characters 13a and 13b. The base members of the intermediate block units 14 and 15 are indicated at reference characters 14a and 15a, and the spool members for the same intermediate block units are indicated at reference characters 14b and 15b.

A lubricant inlet 16, which may be threaded to provide a threaded connection to a lubricant conduit, is formed in the inlet block unit 11, and a pair of lubricant outlets 17, which may also be threaded, are formed in each of the base members $13_a$, $14_a$ and $15_a$.

The hydraulic circuitry of the distributor valve of the present invention is quite complicated, and can be more easily understood by making reference first of all to a distributor valve which operates in the same manner as the valve 10, but which is structurally more simplified than the valve 10. Accordingly, a more simplified valve structure is illustrated in the schematic diagram of FIG. 2. The valve shown in that figure includes hydraulic circuitry which is similar in operation and function to that of the valve shown in FIG. 1. It should be understood, however, that the valves shown in FIGS. 1 and 2 are not identical in terms of structure. The hydraulic circuitry of the distributor valve shown in FIG. 2, however, is similar to that of FIG. 1, as well as a variety of cyclic lubricant distributors, all of which operate generally in similar fashion.

Referring to FIG. 2 there is shown diagrammatically a cyclic lubricant distributor valve 200, which comprises an inlet block unit 201, an end block unit 202 and a plurality of intermediate block units, indicated respectively at reference numerals 203, 204 and 205.

A lubricant pump shown at reference numeral 207 communicates by means of conduit 208 with a threaded inlet 209 formed in the inlet block unit 201. An inlet passageway 210 communicates with the inlet 209 and extends through the inlet block unit 201 and each of the intermediate block units 203, 204 and 205.

A bore 211a is formed in the intermediate block unit 203 and a spool 212a is carried therewithin for slideable back and forth movement. The spool 212a comprises three axially spaced lands 213, 214 and 215, and a pair of spaced grooves 217 and 218 disposed respectively on the opposite sides of the center land 214.

Similar bores 211b and 211c are formed respectively in intermediate block units 204 and 205. Spools 212b and 212c, similar to spool 212a, are carried within the bores 211b and 211c.

A passage 219a communicates the inlet passageway 210 with the central portion of the bore 211a, and similar passages 219b and 219c communicate the inlet passageway 210 with central portions of the bores 211b and 211c for delivering pressurized lubricant from the inlet 209 to the bores 211a–211c.

Another passage 220 communicates the leftward end of the bore 211a of intermediate block unit 203 with the bore $211_b$ of intermediate block 204. Another passage 221 communicates bore 211$_b$ with an outlet 222 formed in the left side of intermediate block unit 203.

Similarly, a passage 223 communicates the rightward end of bore 211$_a$ with bore 211$_b$, and another passage 224 communicates bore 211$_b$ with a second outlet 226 formed in the intermediate block unit 203.

In a similar fashion, passages 227 and 228 communicate respectively the left and right ends of bore 211$_b$ with bore 211$_c$, and passages 229 and 230 communicate respectively the bore 211$_c$ with a pair of outlets 231 and 232 formed in intermediate block unit 204.

A relatively longer passage 233 communicates bore 211$_c$ of intermediate block unit 205 with bore 211$_a$ of intermediate block unit 203. Passage 233, unlike passages 220 and 227, communicates the left end of bore 211$_c$ with an opening in bore 211$_a$ which is located to the right of center thereof.

Another relatively longer passage 234 communicates bore 211$_a$ with an outlet 236 formed in intermediate block unit 205. Similarly, a passage 237 communicates the right end of bore 211$_c$ with an opening formed left of center in bore 211$_a$, and another passage 238 communicates bore 211$_a$ with an outlet 239 formed in intermediate block unit 205.

The hydraulic circuitry of the distributor valve 200, including the inlet 209, the outlets 222, 226, 231, 232, 236 and 239, the bores 211$_a$, 211$_b$ and 211$_c$, the spools 212$_a$, 212$_b$ and 212$_c$ and the interconnecting passages are constructed and arranged such that the spools will move sequentially, from one limiting end position to the other, as long as pressurized lubricant is supplied to the inlet 209. As each of the spools 212$_a$, 212$_b$ and 212$_c$ moves from one end of its corresponding bore to the other, it forces a quantity of lubricant equal to the displacement of the spool from an outlet formed in its corresponding intermediate block unit.

Thus in the condition of operation thereof shown in FIG. 2, the next step in the operation of the distributor valve 200 involves a movement of spool 212$_a$ of the intermediate block unit 203 leftward in bore 211$_a$. Accordingly, while pressurized lubricant in passages 219$a$ and 219$c$ is ineffective in the movement of a spool, the pressurized lubricant in passage 219$b$ can flow through the land 218 of spool 212$_b$ to the right end of bore 211$_a$, thereby causing spool 212$_a$ to move leftward.

As this movement of spool 212$_a$ occurs, the lubricant in the left end of bore 211$_a$ is forced through passage 220, and thence through the land 217 of spool 212$_b$, to be discharged through passage 221 and outlet 222 to a point of utilization such as a bearing or the like which is connected to the outlet 222.

After spool 212$_a$ has moved to its leftward limiting position in bore 211$_a$, the pressurized lubricant in the inlet passage 210 will flow through land 218 of spool 212$_a$ and thence through passage 233 to the left end of bore 211$_c$, thereby causing the spool 212$_c$ to move in a rightward direction, and causing the lubricant in the right end of bore 211c to be discharged through passage 237, land 217 of spool 212$_a$, passage 234 and thence through outlet 236 formed in intermediate block unit 205.

After spool 212$_c$ has moved to its rightward limiting position, spools 212$_b$ and 212$_a$ will be caused to be moved rightward, in sequence, discharging lubricant from their corresponding outlets 228 and 226 in the process. After all of the spools have been moved to their rightward positions, the cycle or sequence of movement of the spools 212$_a$, 212$_b$ and 212$_c$ will repeat itself, first leftward, then rightward and will continue to do so as long as the pump P continues to pump lubricant to the inlet 209.

Referring again to FIG. 1, which discloses an illustrative embodiment of the present invention, a plurality of through bolts 46, 47 and 48 extend through the inlet block unit 11 and the base members 13$_a$, 14$_a$ and 15$_a$ and into the end block unit 12, for maintaining those specific components in fixed assembly. In addition, a pair of threaded bolts 49 and 50 extends through each of the spool members 13$b$, 14$b$ and 15$b$ and into their corresponding base members 13$_a$, 14$_a$ and 15$_a$ to secure each of the spool members to its respective base member. The through bolts 46-48 extend in parallel relation to the longitudinal axis of the distributor valve 10, whereas the bolts 49 and 50 extend in transverse relation thereto. It is noted that by virtue of this arrangement the through bolts 46-48 neither extend through nor exert any force upon the spool members 13$b$, 14$b$ and 15$b$, and the transverse bolts 49 and 50 serve only to connect the spool members 13$b$-15$b$ to their respective base members 13$_a$-15$_a$. Thus the forces exerted by the through bolts 46-48 are applied only in a direction parallel to the longitudinal axis of the distributor valve 10, and then only on the base members of the intermediate block units, and not on the spool members, whereas the forces exerted by the bolts 49 and 50 are applied only in a transverse direction. By virtue of this arrangement distortion of the bores within the spool members is minimized.

Referring to FIG. 3, an inner side wall 51 of the inlet block unit 11 has formed therein a pair of ports 52 and 53 which communicate with one another through a passage 54 in the manner shown in FIG. 5. Similarly ports 56 and 57 communicate with one another through another similar passage 54, as do ports 58 and 59 and ports 60 and 61. An inlet passage 62 communicates with the lubricant inlet 16.

As shown in FIG. 4, the end block unit 12 has an inner side wall 63 in which are formed a series of ports. Thus ports 64 and 66 communicate with one another through a passage 54, as do ports 67 and 68, ports 69 and 70 and ports 71 and 72. Another port 65 dead ends in side wall 63, and represents the termination of the inlet passage which begins with passage 62 formed in the inlet block unit 11.

Referring to FIGS. 8 and 9, intermediate block unit 13 (which is identical to intermediate block units 14 and 15) is shown for ease of understanding with the base member 13$_a$ separated from the spool member 13$_b$. The base member 13$_a$ comprises a pair of side walls 73 and 74 as well as a top wall 75. A plurality of bolt holes 76, 77 and 78 extend through the base member 13$_a$ for receiving the through bolts 46-48. Also formed in the side wall 73 are a plurality of ports 79, 80, 81, 82 and 83.

Corresponding ports 84-88 are formed in the opposite side wall 74 of the base member 13$_a$. The port 79 communicates with the port 84 through a passage 79$a$ which extends through the base member 13$_a$, and ports 80-83 communicate with ports 85-88, respectively, through corresponding passages 80$_a$-83$_a$.

Formed in the top wall 75 of the base member 13$_a$ is a center port 89 which communicates through passage 89$a$ with the port 86 formed in the back wall 74. Another port 90 is formed in the top wall 75 which communicates with a port 91 formed in the back wall 74 through a passage 90$a$, and yet another port 92 is formed in the top wall 75 and communicates with another port 93 formed in the side wall 74 through a passage 92a. Also formed in the top wall 75 are a pair of ports 94 and 95 which communicate respectively with ports 96 and 97 formed in the side wall 74 through passages 94a and 95a.

Ports 98 and 99 formed in the side wall 73 of the base member 13a communicate respectively with the outlets 17 formed at the opposite ends of the base member 13a through passages 98a and 99a. Another pair of ports 100 and 101 communicate respectively with ports 102 and 103 formed in the top wall 75 through passages 100a and 101a.

Another pair of ports 104 and 105 formed in the top wall 75 communicate through passages 104a and 105a with passages 98a and 99a, and therefore communicate respectively with the outlet 17 located on the corresponding side of the base member 13a. Ports 104 and 105 are provided only for the purpose of interconnecting the two outlets 17 of a single base member, in the event both outlets are connected to a single lubrication point. Normally ports 104 and 105 are not interconnected with one another, and therefore do not interconnect the two outlets 17 of a single base member.

Each of the ports formed in the side wall 73 of the base member 13a has a corresponding port in alignment therewith in the side wall 74 thereof as a consequence of which the various intermediate block units 13a–15a are interchangeable with one another, since they are all identical.

A bottom wall 106 of the spool member 13b contains a plurality of ports which register with ports formed in the top wall 75 of the base member 13b. Thus a port 107 communicates with port 89, a port 108 with port 90, a port 109 with port 94, a port 110 with port 92, and a port 111 with port 95. Similarly, a port 112 communicates with port 105, a port 113 with port 103, a port 114 with port 102, and a port 115 with port 104.

Also formed in the base member 13a are a pair of bolt holes 116 and 117 which correspond respectively with bolt holes 118 and 119 formed in the spool member 13b for receiving the threaded bolts 49 and 50.

Figure 7:
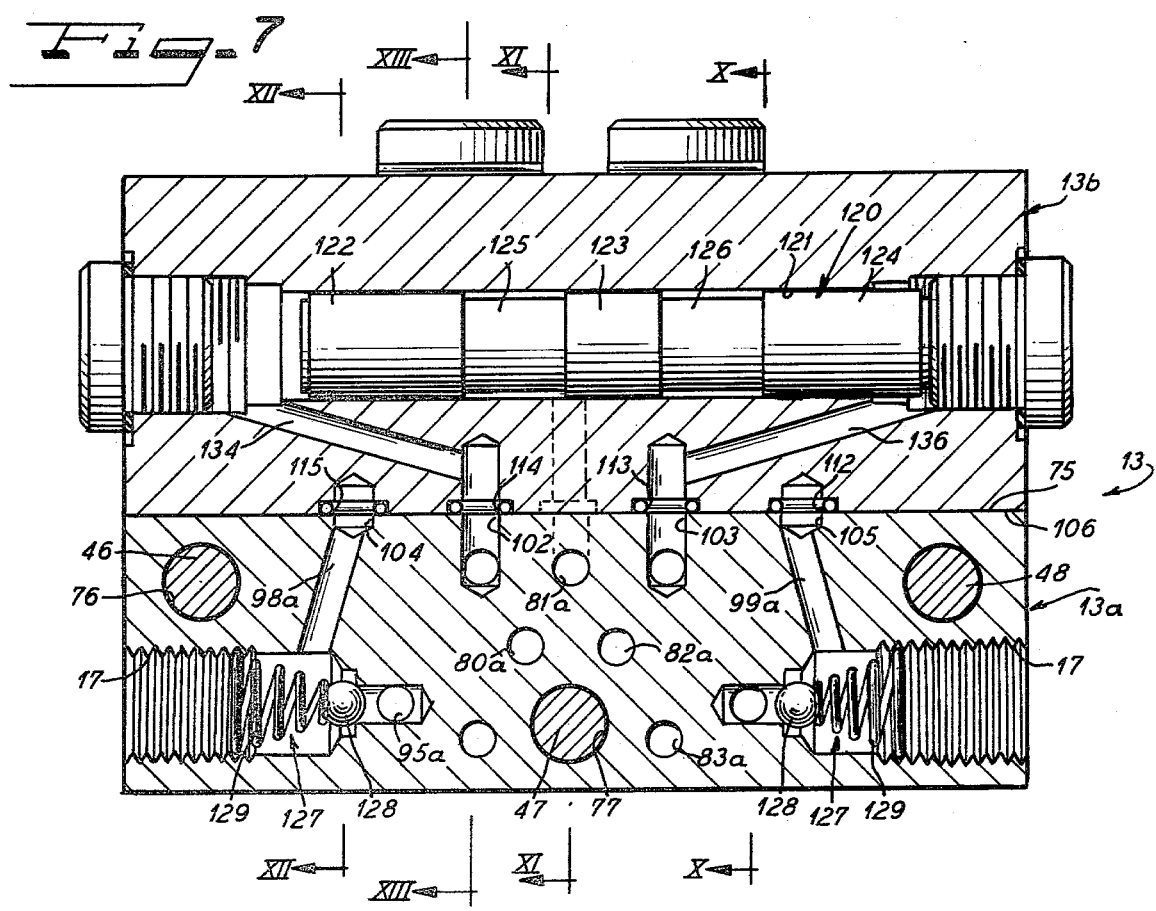
FIG. 7 is another sectional view of an intermediate block unit, taken along lines VII—VII of FIG. 1.

In FIGS. 6 and 7, various ports, passages and the like of intermediate block unit 13 are shown as they appear above the corresponding section lines shown in FIG. 1. In addition, other components of intermediate block unit 13, for example, a spool 120 within a bore 121, also appear along the section lines. Since intermediate block units 14 and 15 are identical to intermediate block unit 13, FIGS. 6 and 7 are equally applicable to all of the intermediate block units 13–15.

The spool 120 corresponds to spool 212a of FIG. 2 and the bore 121 corresponds to bore 211a. The spool 120 comprises three lands 122, 123 and 124, with grooves 125 and 126 therebetween.

A pair of check valves 127, 127 are located in the outlets 17, 17 of the base member 13a, and are provided respectively with a ball check 128 and a spring 129. The purpose of the check valves 127, 127 is to prevent reverse flow and pressure waves which could otherwise occur through the outlets 17, 17, particularly in lubrication applications in which the lubricant is delivered at substantial pressures, for example, in the range of 2000–3000 psi.

Figure 14:
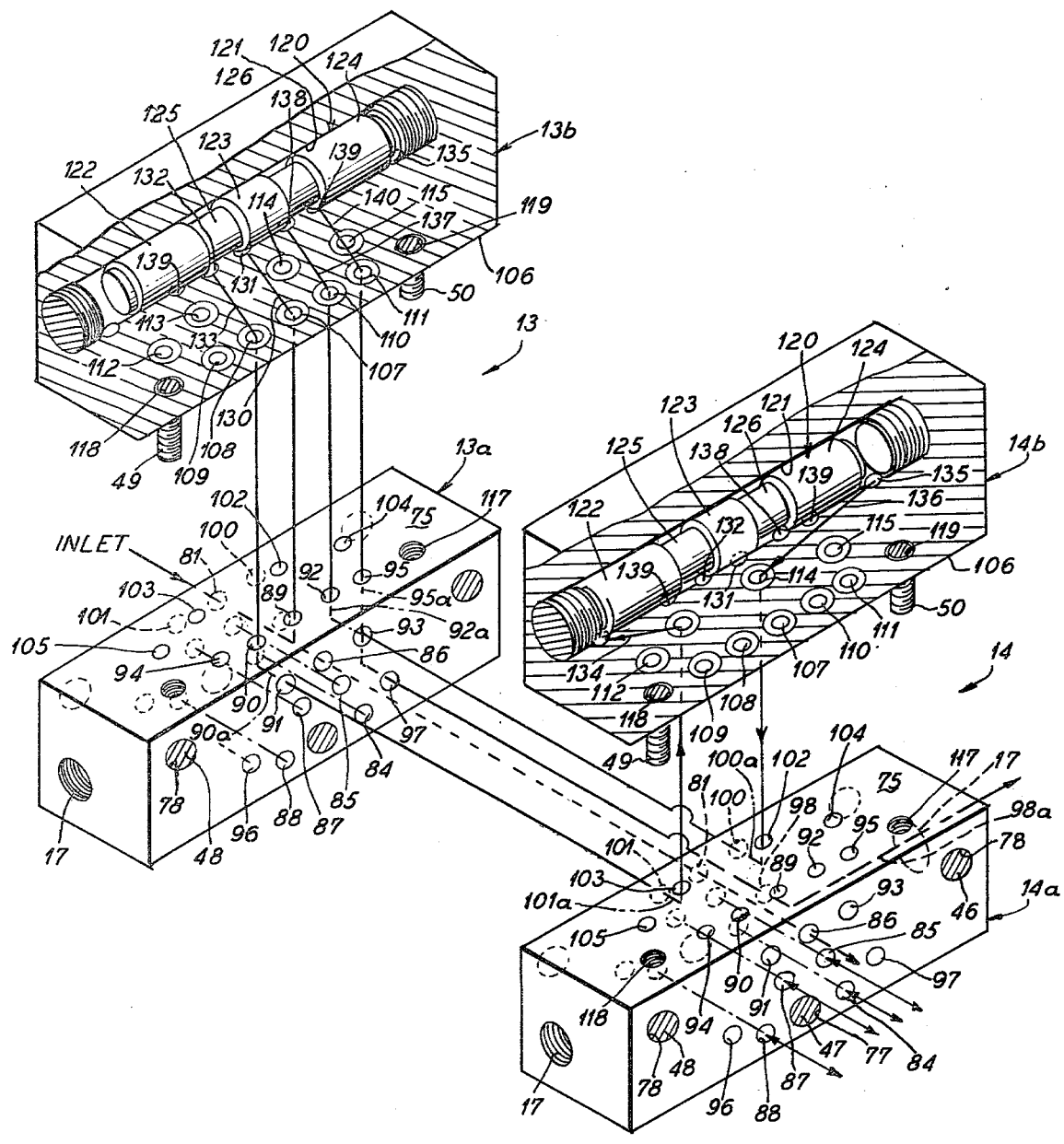
FIG. 14 is a schematic diagram showing a pair of adjacent intermediate block units with the base members and spool members disposed in spaced relation for ease of understanding the basic hydraulic circuitry of the valve and the manner in which the lubricant flows through and between the intermediate block units.

FIG. 14 is a perspective view of a pair of adjacent intermediate block units, such as, for example, block units 13 and 14, and the flow of lubricant through the hydraulic circuitry thereof during operation of the distributor valve 10. For illustrative purposes and for ease in understanding the operation thereof, the intermediate block units 13 and 14 are separated from one another, and the base and spool members of each of the individual block units are also shown spaced from one another.

Assuming that pressurized lubricant is introduced into the port 81 of the base member 13a of the intermediate block unit 13, the lubricant flows through the passage 81a to the port 89 formed in the top wall 75 of the base member 13a and into the port 107 formed in the bottom wall 106 of the spool member 13b. From port 107 the lubricant flows through a passage 130 to a port 131 which communicates with the bore 121. Since the spool 120 of the block unit 13 is located at its rightward position as shown in FIG. 14, the lubricant flows through groove 125 to another port 132, from which it flows through a passage 133 to port 108 formed in the bottom wall 106 of the spool member 13b.

From port 108 the lubricant flows into port 90 formed in the top wall 75 of the base member 13b, from whence it flows through passage 90a to port 91 of the base member 13a to port 101 of the base member 14a.

From port 101 the lubricant flows through passage 101a to port 103 formed in the top wall 75 of the base member 14a and thence into port 113 formed in the bottom wall 106 of the spool member 14b. From port 113 the lubricant flows through a passage 134 to one end of the bore 121 of the spool member 14b, by virtue of which the spool 120 of the spool member 14b moves in a rightward direction as viewed in FIG. 14, to force lubricant from a port 135 through a passage 136 to the port 114 formed in the bottom wall 106 of the spool member 14b.

From the port 114 the lubricant flows into port 102 formed in the top wall 75 of the base member 14a, and thence through passage 100a and port 100 into port 93 of base member 13a.

From the port 93 the lubricant flows through a passage 92a to port 92 formed in the top wall 75 of the base member 13a, and thence into port 110 formed in the bottom wall 106 of the spool member 13b, from which it flows through a passage 137 to a port 138 formed in the bore 121 of the spool member 13a.

From port 138 the lubricant flows through the groove 126 of the spool 120 to a port 139 which also communicates with the bore 121, from which it flows through a passage 140 to port 111 formed in the bottom wall 106 of spool member 13b.

From port 111 the lubricant flows into port 95 formed in the base member 13a, and thence through passage 95a to port 97, from which it flows into port 98 and then through passage 98a to outlet 17 formed in base member 14a.

After the spool 120 of intermediate block unit 14 has moved rightward as viewed in FIG. 14 the spool of the next intermediate block unit will be moved sequentially, in the manner explained in connection with the foregoing description of FIG. 2, and the cyclic operation continues as long as pressurized lubricant is introduced to the inlet passage of the distributor valve.

As shown in FIGS. 6 and 7, "O" rings are provided between the ports of faying faces of the spool members and their associated base members, as well as between the faying faces of the side walls of the adjacent base members and the base members and the inlet and outlet block units.

Referring to FIG. 6, a pair of plugs 141 and 142 are inserted into threaded bores 143 and 143a which open to a top wall 144 of the spool member 13b. A pair of passages 146 and 146a communicate bore 143 with port 115 and another pair of passages 149 and 149a communicate bore 143a with port 112. Passages 147 and 148 also communicate with bores 143 and 143a respectively but do not communicate with one another.

The purpose of the bores 143 and 143a and the passages 146-149 is to permit the two outlets 17, 17 of the base member 13a to be placed in fluid communication with one another merely by extending passage 148 to connect with passage 147. The two outlets 17, 17 may be interconnected when it is desirable to supply only a single point of use with lubricant from a given intermediate block unit, regardless of the direction of travel of the associated spool. By interconnecting the two outlets 17, 17 internally, and by plugging one of the outlets, all of the lubricant supplied from the intermediate block unit will be directed to the point of use connected to the remaining operative outlet.

While the intermediate block units 13-15 are identical, they are interchangeable. On the other hand, they are not reverisble, since they are not symmetrical about a plane extending through their respective longitudinal axes and at right angles to the walls 75 thereof, so far as the various ports and passages therein are concerned.

In order to prevent the reversal of a spool member, the inlet block unit 11 and the end block unit 12 both extend vertically the full height of the intermediate block units 13-15. By virtue of this arrangement it is physically impossible to mismatch the spool member of an intermediate block unit, since a mismatch would immediately be discernible from the improper spacing which would result between the inlet or end block unit and the adjacent intermediate block unit.

In addition to the advantages of the present invention in respect of "add-on" capability and ease of replacement, other advantages are available. For example, since none of the passages are particularly long, they can be more easily unclogged, especially when grease becomes hardened therein. Low-cost grease can be particularly troublesome in this respect, since the base and oil thereof more readily divides and separates, and the base more readily hardens.

Furthermore, in the event a base member becomes defective due to a stripped bolt-hole or a worn seat for an outlet check valve, only the base member and not the entire intermediate block unit need be replaced. In the event the bore in a spool member becomes worn, only the spool member need be replaced. Inventory of parts is also exceedingly simplified because of the interchangeability of the various base members and spool members.

Although minor modifications might be suggested by those versed in the art, it should be understood that we wish to embody within the scope of the patent warranted hereon all such modifications as reasonably come within the scope of our contribution to the art.

What we claim is:

1. A cyclic lubricant distributor valve comprising an inlet block unit having a lubricant inlet,
an end block unit,
a plurality of intermediate block units between said inlet and end block units,
each of said intermediate block units comprising a base member and a spool member,
said spool member having a bore and a spool movable in said bore, and said base member having at least one outlet,
said spool member and said base member having cooperating faying faces abutting one another,
means forming hydraulic circuitry in said inlet block unit, said end block unit and said intermediate block units for interconnecting said inlet, said spools and said outlets to provide for cyclic operation of said valve,
said hydraulic circuitry interconnecting said spool members with their corresponding base members only through said cooperating faying faces,
first fastening means for fastening said inlet block units, said end block unit and said base members in fixed assembly, and
second fastening means for fastening each spool member in fixed assembly only to its corresponding base member, said inlet block unit and said end block unit having a height greater than the height of the base member of said intermediate block units.

2. A device of claim 1 wherein said inlet block unit and said end block units have a height equal to the height of said intermediate block units.

* * * * *